United States Patent
Arunkumar et al.

(10) Patent No.: US 11,468,045 B2
(45) Date of Patent: Oct. 11, 2022

(54) TRANSACTIONAL SUPPORT FOR NON-RELATIONAL DATABASE

(71) Applicant: Microsoft Technology Licensing, LLC, Redmond, WA (US)

(72) Inventors: Yuva Priya Arunkumar, Redmond, WA (US); Anthony Lin, Seattle, WA (US); Deiva Shankar UthayaSankaralingam, Redmond, WA (US); Yingtao Dong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 16/852,211

(22) Filed: Apr. 17, 2020

(65) Prior Publication Data
US 2021/0326330 A1 Oct. 21, 2021

(51) Int. Cl.
*G06F 16/00* (2019.01)
*G06F 16/23* (2019.01)
*G06F 16/245* (2019.01)
*G06F 16/21* (2019.01)

(52) U.S. Cl.
CPC ........ *G06F 16/2379* (2019.01); *G06F 16/219* (2019.01); *G06F 16/245* (2019.01)

(58) Field of Classification Search
CPC ............... G06F 16/2308; G06F 16/219; G06F 16/2379; G06F 16/245
See application file for complete search history.

(56) References Cited

U.S. PATENT DOCUMENTS

| | | | | |
|---|---|---|---|---|
| 8,650,156 | B1 * | 2/2014 | McHugh | G06F 16/1873 707/638 |
| 8,667,494 | B1 * | 3/2014 | Riordan | G06F 9/5011 718/104 |
| 9,201,685 | B2 * | 12/2015 | Beerbower | G06F 9/466 |
| 9,218,385 | B2 * | 12/2015 | Tan | G06F 16/22 |
| 9,727,600 | B2 * | 8/2017 | Fu | G06F 16/24578 |
| 9,734,187 | B2 * | 8/2017 | Fuchs | G06F 16/2379 |

(Continued)

OTHER PUBLICATIONS

"International Search Report and Written Opinion Issued in PCT Application No. PCT/US21/018434", dated May 27, 2021, 11 Pages.

(Continued)

*Primary Examiner* — Shiow-Jy Fan
(74) *Attorney, Agent, or Firm* — Christopher J. Volkmann; Kelly, Holt & Christenson, PLLC

(57) ABSTRACT

Techniques of transaction support for a database are disclosed herein. One example technique includes generating a new version value for key-value pairs in the database and creating, in the database, a new key-value pair corresponding to a parameter to be updated with a new value using both the generated new version value and a name of the parameter as a key and the new value as the corresponding value for the created new key-value pair. The example technique can then include determining whether creating the new key-value pair is completed successfully in the database, and in response to determining that creating the new key-value pair corresponding to the parameter is not completed successfully, the existing value of the parameter is returned as a current value of the parameter instead of the new value in response to a query for the current value of the parameter.

20 Claims, 10 Drawing Sheets

(56) References Cited

U.S. PATENT DOCUMENTS

| | | | | |
|---|---|---|---|---|
| 2001/0034254 | A1* | 10/2001 | Ranta | H04B 1/7115 |
| | | | | 455/574 |
| 2015/0227573 | A1 | 8/2015 | Castellano | |
| 2016/0188710 | A1* | 6/2016 | Dulba Naik | G06F 16/214 |
| | | | | 707/792 |
| 2017/0161352 | A1 | 6/2017 | Horii | |
| 2017/0270137 | A1* | 9/2017 | Sharma | G06F 16/275 |
| 2018/0322156 | A1* | 11/2018 | Lee | G06F 16/23 |
| 2019/0288850 | A1 | 9/2019 | Beecham et al. | |

OTHER PUBLICATIONS

"Amazon DynamoDB Transactions: How It Works", Retrieved from: https://web.archive.org/web/20191104214940/https:/docs.aws.amazon.com/amazondynamodb/latest/developerguide/transaction-apis.html, Nov. 4, 2019, 8 Pages.

"Atomicity (Database Systems)", Retrieved from: https://en.wikipedia.org/wiki/Atomicity_(database systems), Aug. 22, 2019, 2 Pages.

"Atomicity and Transactions", Retrieved from: https://docs.mongodb.com/manual/core/write-operations-atomicity/, Retrieved on May 13, 2019, 2 Pages.

"Isolation (Database Systems)", Retrieved from: https://en.wikipedia.org/wiki/Isolation_(database_systems), Retrieved on May 13, 2019, 8 Pages.

Gu, et al., "Keys and Values", Retrieved from: https://docs.microsoft.com/en-US/azure/azure-app-configuration/concept-key-value, Apr. 19, 2019, 6 Pages.

Pimentel, Stephen, "The Return of ACID in the Design of NoSQL Databases", Retrieved from: http://web.archive.org/web/20130609222230/https:/www.methodsandtools.com/archive/acidnosqldatabase.php, Jun. 9, 2013, 3 Pages.

Plumley, et al., "Database Types and Descriptions in SharePoint Server", Retrieved from: https://docs.microsoft.com/en-us/sharepoint/technical-reference/database-types-and-descriptions, Nov. 20, 2019, 32 Pages.

* cited by examiner

TRANSACTIONAL SUPPORT FOR NON-RELATIONAL DATABASE

BACKGROUND

In computing, a database comprises an organized set of structured information stored electronically in a computing system. For example, a weather database can include a set of data records each containing daily high and low temperatures, wind directions and strengths, sunrise and sunset times, an amount of daily precipitation, and other weather information. Data records in a database can be queried, managed, modified, updated, controlled, and organized. For instance, a user can query a weather database using a date (e.g., Mar. 21, 2020) as a keyword to retrieve a data record corresponding to that date. From the retrieved data record, the user can obtain desired weather information for that date.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Databases may be categorized as relational and non-relational databases. A relational database allows identifying and accessing data items in relation to another data item in multiple tables of the same database. For example, a weather database can include a date table having records of dates in a year indexed to a number of days from a beginning date of the year (e.g., January 1). The weather database can also include a weather table having weather records indexed to dates in the year. As such, when a user queries for a weather record that is 180 days from the beginning of the year, a search program can identity a date value (e.g., June 29) in the date table using "180" as a keyword and then locate a weather record in the weather table using the identified date value.

In contrast, a non-relational database typically does not rely on relationship of different data items for identifying and accessing data in a database. Instead, non-relational databases typically include a collection of key-value pairs. For example, a non-relational weather database can use date values as keys and various weather information as corresponding values. As such, the non-relational weather database can include multiple key-value pairs holding different weather information for a date value.

Typically, relational databases provide more transactional support than non-relational databases. For example, Structured Query Language ("SQL") and other relational database programming languages can provide a set of properties that guarantee database transactions are processed reliably. The properties can include Atomicity, Consistency, Isolation, and Durability ("ACID"). Atomicity guarantees that each transaction with multiple operations is treated as a single "unit" that either succeeds or fails completely. Consistency ensures that a transaction can only bring a database from one valid state to another valid state. Isolation ensures that concurrent execution of transactions leaves a database in the same state that would have been obtained if the transactions were executed in the database sequentially. Durability guarantees that once a transaction has been committed, the transaction remains committed in a database in the event of a system failure (e.g., power outage).

Holding data in relational databases, however, can have several drawbacks. First, deploying and maintaining a relational database can be costly. The various facilities used to provide extensive transactional support can incur high capital and operating costs. Secondly, a relational database used as a central repository can be a single point of failure that impacts an entire computing system. For example, a relational database can be used to hold records of tenant settings and document indices for multiple tenants of a cloud service, e.g., a document management service. A failure of the relational database or access thereto can interrupt the cloud service even though other components supporting the cloud service are still functional. In contrast, non-relational databases can be cheaper to deploy and maintain than relational databases. Non-relational databases can also be distributedly deployed in a computing system and thus avoiding becoming a single point of failure. For instance, in the cloud service example above, a non-relational database can be deployed for each tenant to hold tenant settings and document indices. Each of the non-relational databases can operate independently. As such, even though one non-relational database fails, such a failure would not impact operations of other non-relational databases for other tenants.

Though non-relational databases can be more suitably deployed distributedly than relational databases, certain transactional support provided by relational databases can be useful for non-relational databases. For example, a tenant of a cloud service can introduce a transaction to modify multiple tenant settings in a non-relational database. As such, atomicity can be useful to guarantee that the modification of the multiple tenant settings either succeeds as a single transaction or fails completely even when just one tenant setting failed to be modified. In another example, multiple users of a single tenant may attempt to modify a tenant setting at the same time. As such, the non-relational database may only allow one transaction to occur at a time to ensure that a newer version of the tenant setting does not overwrite an older version.

Several embodiments of the disclosed technology can address aspects of the foregoing drawbacks of non-relational databases by implementing a database management system configured to provide certain transactional support for a non-relational database. In certain implementations, the non-relational database can include a set of key-value pairs and a set of control records. In one embodiment, the key-value pairs can include a key that includes a version value corresponding to a value of the key-value pair. For instance, a key-value pair for a parameter "A1" of version "V0" can have a key of "V0:A1" and a value of "1" while another key-value pair of version "V1" can include a key of "V1:A1" and a value of "2." As such, the parameter "A1" can have multiple key-value pairs each corresponding to a different version of the parameter "A1." In other embodiments, the key-value pairs can include a version value appended to the key-value pairs as metadata or can be included in other suitable manners.

In certain implementations, the control records can include a committed version record, a latest version record, and a version index. The committed version record can contain data indicating one or more versions corresponding transactions of which have been completed successfully in the non-relational database. The latest version record can contain data indicating a latest version that has been used for updating any of the key-value pairs in the non-relational database. In certain embodiments, the latest version record and the committed version record can individually contain a default version value (e.g., "V0") when no transactions have been performed in the non-relational database. When at least one transaction is performed, the latest version record can include a new version value different than the default version value. When at least one transaction is performed and completed successfully, the committed version record can include a new version value corresponding to the successfully completed transaction. The version index can include one or more entries each identifying one or more parameters that have been modified for a particular version value. For example, one entry in the version index can identify that version "V1" involves changes to parameter "A1" in the key-value pairs.

In operation, the database management system can be configured to assure atomicity by monitoring for successful completion of a transaction and selectively updating the committed version record. For instance, a non-relational database may include a key-value pair for the parameter "A1" with a default version value, such as "V0:A1" and a value of "1." Upon receiving a transaction request to update the parameter "A1" to a new value (e.g., "2"), the database management system can be configured to determine a latest version that has been used in the non-relational database by determining a current value in the latest version record (e.g., "V0"). Upon determining the current value in the latest version record, the database management system can be configured to assign the latest version record a new version value, for instance, "V1," and creates a new key for the parameter "A1" with the new version value, e.g., "V1:.A1." The database management system can then be configured to create a new key-value pair in the non-relational database with the new key (i.e., "V1:A1") and assign the new value, e.g., "2" to the created new key-value pair. The database management system can then be configured to update the version index to indicate that version "V1" impacts the parameter "A1."

The database management system can then be configured to determine whether all operations of the transaction, such as the foregoing operations have completed successfully. In response to determining that all of the operations of the transaction have completed successfully, the database management system can be configured to update the committed version record with the new version value, i.e., "V1" from "V0." On the other hand, when at least one operation of the transaction failed, the database management system can be configured to prevent the committed version record from being updated and instead maintain the current value of the committed version record. As such, in the example above, the committed version record can still contain a value of "V0" even though the key-value pairs include the newly created key-value pair for "V1" for the parameter "A1," i.e., "V1:A1" with a value of "2," and the latest version record contains a value of "V1."

During a read operation that queries for a value of the parameter "A1," the database management system can be configured to determine a committed version value in the non-relational database by consulting the committed version record. In the example above, when the transaction failed, the committed version record contains a value of "V0." In response, the database management system can be configured to locate a key-value pair that has a key with the version value "V0" for parameter "A1," i.e., "V0:A1." The database management system can then read the corresponding value, e.g., "1" from the key-value pair having the key "V0:A1," and provide the value in response to the query. Thus, even though another key-value pair, i.e., "V1:A1→2" exists in the non-relational database, the corresponding value, i.e., "2" for "V1:A1" is not provided in response to the query because the transaction corresponding to version "V1" has failed. As such, atomicity in the non-relational database is achieved.

The database management system can also be configured to ensure isolation by implementing a timer that is configured to maintain an elapsed time since a new version value is created. For instance, in the example above, a timer can be started when the database management system modifies the value of the latest version record from "V0" to "V1." Subsequently, the database management system can receive a new transaction request to the non-relational database. In response, the database management system can be configured to determine whether the latest version record contains a version value that is indicated as committed in the committed version record. In response to determining that the latest version record contains a version value that is indicated as committed in the committed version record, the database management system can be configured to initializing processing of the new transaction request. On the other hand, in response to determining that the latest version record contains a version value that is not indicated as committed in the committed version record, the database management system can be configured to determine whether the elapsed time of the timer exceeds a threshold. If yes, the database management system can be configured to regard the prior transaction to have failed and initialize processing of the new transaction request. Otherwise, the database management system can reject or delay processing the new transaction request such that the prior transaction request can be isolated from processing of the new transaction request.

Several embodiments of the disclosed technology can thus provide certain transactional support for non-relational databases to ensure atomicity and isolation. For instance, by creating new key-value pairs for every modification of a parameter, e.g., "A1" and selectively updating the committed version record, a value of a version corresponding to a failed transaction is not provided as a current value for the parameter. In another aspect, by implementing a timer to maintain an elapsed time when a new version is created in the latest version record, a transaction in the non-relational database can be isolated from other transactions as long as the elapsed time does not exceed the threshold. Thus, the database management system can ensure transactions are processed reliably in the non-relational database.

DETAILED DESCRIPTION

Figure 1:
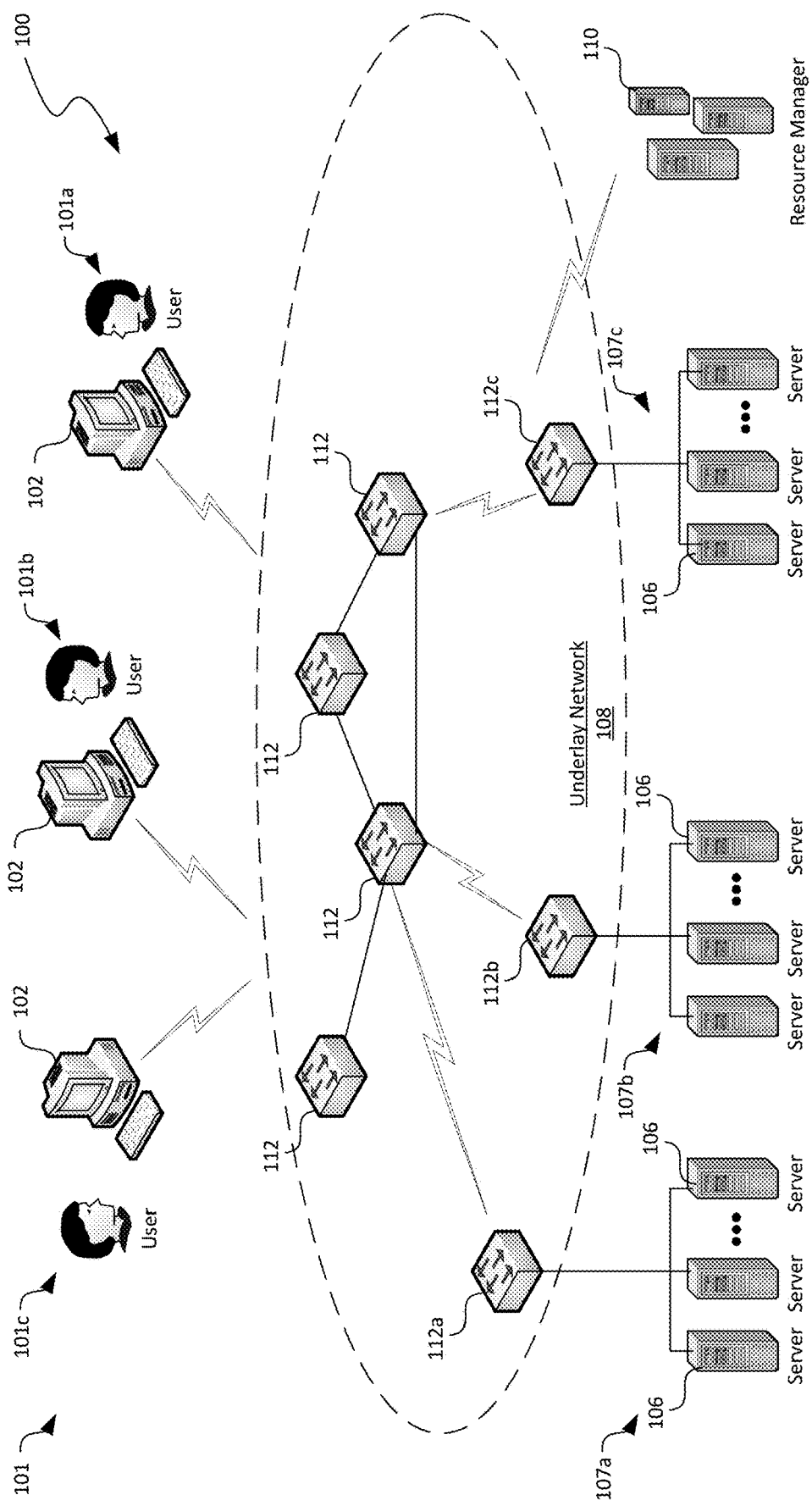
FIG. 1 is a schematic diagram illustrating a distributed computing system implementing certain transactional support for non-relational databases in accordance with embodiments of the disclosed technology.

Certain embodiments of systems, devices, components, modules, routines, data structures, and processes for implementing certain transactional support for non-relational databases in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

In some examples, a distributed computing system can include a computing facility having a computer network interconnecting a plurality of host machines to one another or to external networks (e.g., the Internet). An example of such a computing facility can include a datacenter for providing cloud computing services. A compute network can include a plurality of network devices. A "network device" can include a physical network device, examples of which include routers, switches, hubs, bridges, load balancers, security gateways, or firewalls. A "host" can be a server or other suitable types of hardware/software computing device that is configured to provide a hypervisor that supports one or more virtual machines, virtual switches, or other suitable types of virtual components.

In some examples, a hypervisor can include computer software, firmware, and/or hardware that creates, manages, and runs one or more virtual machines on a host machine. A virtual machine or "VM" can be an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

In some examples, a computing service or cloud service includes one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS includes delivery of operating systems and associated services over the computer network without requiring downloads or installation. IaaS includes outsourcing equipment used to support storage, hardware, servers, network devices, or other components, all of which are made accessible over a computer network.

In some examples, a database includes an organized set of structured information stored electronically in a computing system. A database can be a relational database that allows identifying and accessing data items in relation to another data item in multiple tables of the same database. A database can also be a non-relational database that does not rely on relationship of different data items for identifying and accessing data in a database. Instead, a non-relational database can include a collection of key-value pairs.

In some examples, a key-value pair includes a data record that includes a key that is searchable and a corresponding value. For instance, a key-value pair can include a name of a parameter (e.g., "A1") as a key and a value (e.g., "1") of the parameter "A1" as the value. In the descriptions below, a key-value pair is represented using an arrow to indicate the value corresponding to a key in a key-value pair. For instance, an example key-value pair can be "A1→1" indicating a key of "A1" with a value of "1." As described in more detail herein, in accordance with embodiments of the disclosed technology, individual key-value pairs can also use both a version value and a name of a parameter as a key. For instance, the parameter "A1" can have multiple key-value pairs with different version values such as "V0:A1," "V1:A1," "V2:A1," etc., each with a different value. Such key-value pairs can be searched in a database to locate a corresponding value.

Further, in some examples, a version value for key-value pairs in a database can be a value corresponding to an alteration in the database. For instance, a first version value can correspond to updating of a first parameter while a second version value more recent than the first version value can correspond to updating a second parameter. A latest version record can be a control record in a database that contains the most recently used version value. A committed version record can be another control record that contains data representing version values corresponding transactions of which have been completed successfully in the database.

Typically, relational databases provide certain transactional support that non-relational databases may also benefit from. For example, Structured Query Language ("SQL") and other relational database programming languages can provide Atomicity, Consistency, Isolation, and Durability ("ACID"). Atomicity guarantees that each transaction with multiple operations is treated as a single "unit" that either succeeds or fails completely. Consistency ensures that a transaction can only bring a database from one valid state to another valid state. Isolation ensures that concurrent execution of transactions leaves a database in the same state that would have been obtained if the transactions were executed in the database sequentially. Durability guarantees that once a transaction has been committed, the transaction remains committed in a database in the event of a system failure (e.g., power outage).

Though non-relational databases can be more suitably deployed distributedly than relational databases, certain transactional support provided by relational databases can be useful for non-relational databases. For example, a tenant of a cloud service can introduce a transaction to modify multiple tenant settings in a non-relational database. As such, atomicity can be useful to guarantee that the modification of the multiple tenant settings either succeeds as a single transaction or fails completely even when just one tenant setting failed to be modified. In another example, multiple users of a single tenant may attempt to modify a tenant setting at the same time. As such, the non-relational database may only allow one transaction to occur at a time to ensure that a newer version of the tenant setting does not overwrite an older version.

Several embodiments of the disclosed technology can address aspects of the foregoing drawbacks of non-relational databases by implementing a database management system configured to provide certain transactional support for a non-relational database. For instance, by creating new key-value pairs for every modification of a parameter, e.g., "A1"

and selectively updating the committed version record, a value of a version corresponding to a failed transaction is not provided as a current value for the parameter. In another example, by implementing a timer to maintain an elapsed time when a new version is created, a transaction in the non-relational database can be isolated from other transactions as long as the elapsed time does not exceed the threshold. Thus, the database management system can ensure transactions are processed reliably in the non-relational database, as described in more detail below with reference to FIGS. 1-6.

FIG. 1 is a schematic diagram illustrating a distributed computing system 100 having hosts implementing certain transactional support for non-relational databases in accordance with embodiments of the disclosed technology. As shown in FIG. 1, the distributed computing system 100 can include a computer network (shown as an "underlay network 108") interconnecting a plurality of host machines shown as servers 106, a plurality of client devices 102 of users 101, and a resource manager 110 to one another. The resource manager 110 can be a cluster controller, a fabric controller, a database controller, and/or other suitable types of controller configured to monitor and manage resources and operations of the servers 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three clusters identified individually as first, second, and third clusters 107a-107c. In the illustrated embodiment, each of the clusters 107a-107c is operatively coupled to a corresponding network device 112a-112c, respectively. The network devices 112a-112c can then be operatively coupled to additional network devices 112 to form a network in a hierarchical, flat, mesh, or other suitable types of topology. The computer network can allow communications among the servers 106 and the client devices 102. In other embodiments, the multiple host machine sets 107a-107c can share a single network device 112 or can have other suitable arrangements.

The servers 106 can individually be configured to provide computing, storage, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 or administrator 104 to access computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable numbers of users 101 or administrators to access cloud and/or other suitable types of computing services provided by the servers 106 and/or other components in the distributed computing system 100.

Figure 2:
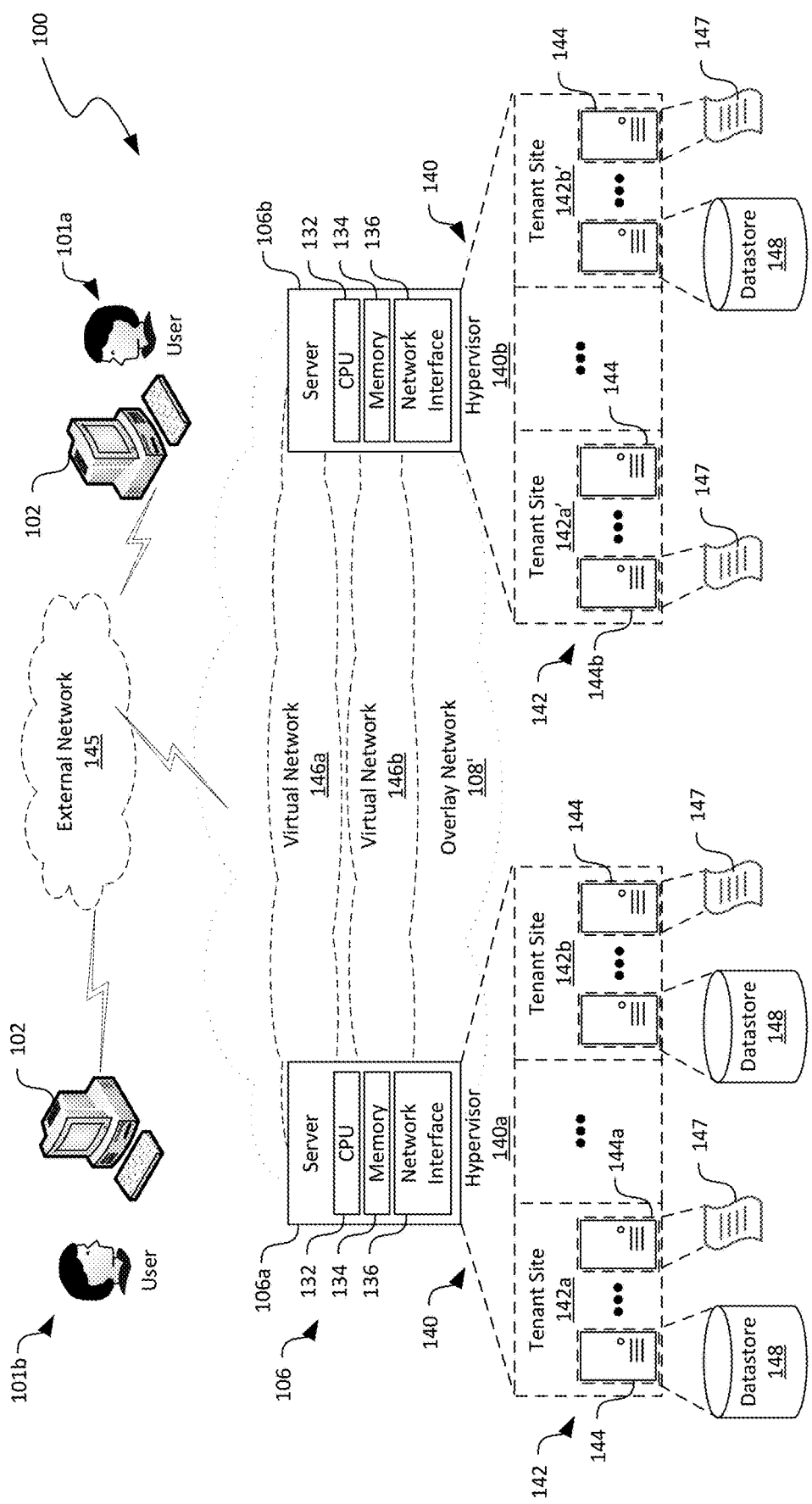
FIG. 2 is a schematic diagram illustrating certain hardware and software components of the distributed computing system of FIG. 1 for providing cloud services to tenants in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first server 106a and the second server 106b can each include a CPU 132, a memory 134, and a network interface 136 operatively coupled to one another. The CPU 132 can include one or more processors, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 132 (e.g., instructions for performing the methods discussed below with reference to FIGS. 5A and 5B). The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the CPU 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. The hypervisors 140 are individually shown in FIG. 2 as software components. However, in other embodiments, the hypervisors 140 can also include firmware and/or hardware components.

The tenant sites 142 can each include multiple virtual machines 144 for a particular tenant. For example, the first server 106a and the second server 106b can both host the tenant site 142a and 142a' for a first user 101a. The first server 106a and the second server 106b can both host the tenant site 142b and 142b' for a second user 101b. Each virtual machine 144 can be executing applications or processes 147 corresponding to an operating system, middleware, and/or suitable applications and/or providing access to a datastore 148. The executed applications or processes 147 can each correspond to one or more computing services or other suitable types of computing services. One example application 147 is a management system 170 (shown in FIG. 3) that is configured to access the datastore 148 with certain transactional support. Example components of the management system 170 and the datastore 148 are as discussed in more detail below with reference to FIGS. 3A-3F.

Also shown in FIG. 2, the computing system 100 can include an overlay network 108' having one or more virtual networks 146 that interconnect the tenant sites 142a and 142b across the first and second servers 106a and 106b. For example, a first virtual network 146a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to a single tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the servers 106 can facilitate communications among the virtual machines and/or applications executing in the virtual machines 144. For example, the CPU 132 of the first server 106a can execute suitable network communication operations to facilitate the first virtual machine 144a to transmit packets to the second virtual machine 144b via the virtual network 146a by traversing the network interface 136 on the first server 106a, the underlay network 108 (FIG. 1), and the network interface 136 on the second server 106b. As such, the first virtual machine 144a of a tenant site 142a on the first server 106a can cooperate with another virtual machine 144b on another server 106b to execute suitable applications or processes 147 in order to provide suitable computing services to the users 101.

FIGS. 3A-3F are schematic block diagrams illustrating a management system that provides atomicity transactional support in a non-relational database in the distributed computing system 100 in accordance with embodiments of the present technology. In FIGS. 3A-3F and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

Figure 3A:
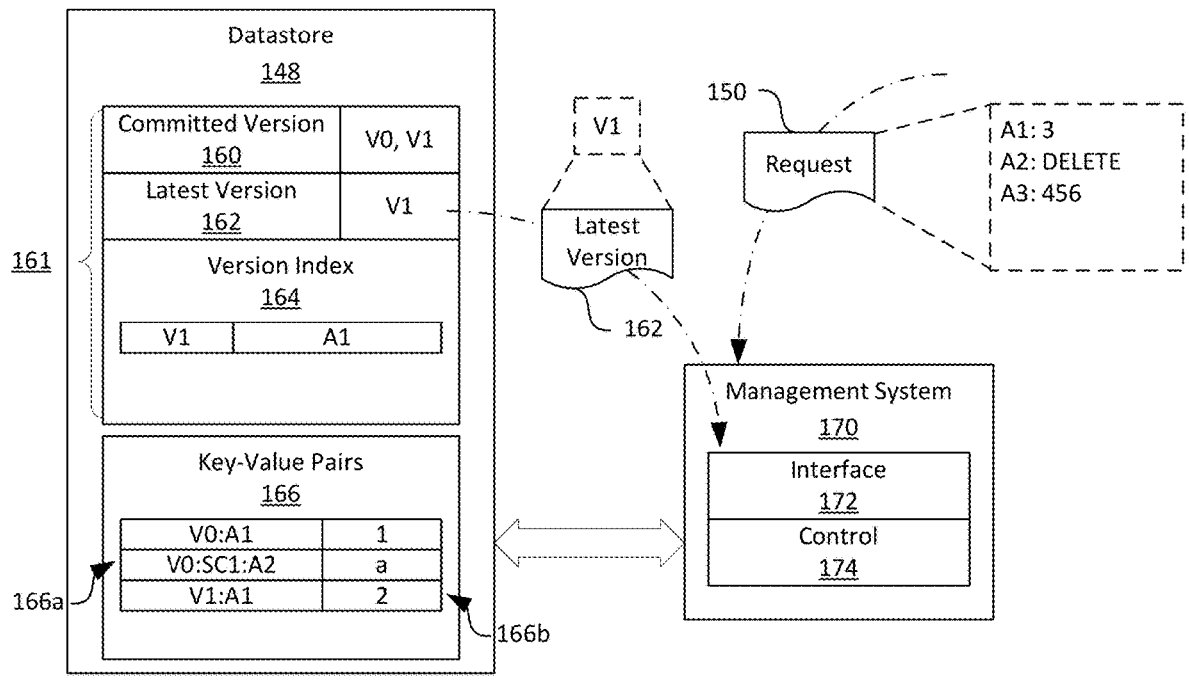
FIGS. 3A-3F are schematic block diagrams illustrating a management system that provides atomicity transactional support in a non-relational database in the distributed computing system in accordance with embodiments of the present technology.

As shown in FIG. 3A, the datastore 148 can include a set of key-value pairs 166 and a set of control records 161. Each key-value pair 166 can include a key 166a and a corresponding value 166b. In one embodiment, the key-value pairs 166 can each include a key 166a that has a version value corresponding to a value 166b of the key-value pair 166. For instance, as illustrated in FIG. 3A, a key-value pair 166 for a parameter "A1" of version "V0" can have a key of "V0:A1" and a value of "1" while another key-value pair 166 of version "V1" can include a key 166a of "V1:A1" and a value 166b of "2." As such, the parameter "A1" can have multiple key-value pairs 166 each corresponding to a different version of the parameter "A1." In other embodiments, the key-value pairs 166 can include a version value (not shown) appended to the key-value pairs 166 as metadata or can be included in other suitable manners.

As shown in FIG. 3A, in certain implementations, the control records 161 can include a committed version record 160, a latest version record 162, and a version index 164. The committed version record 160 can contain data indicating one or more versions or version values corresponding transactions of which have been completed successfully in the datastore 148. The latest version record 162 can contain data indicating a latest version or version value that has been used for updating any of the key-value pairs 166 in the datastore 148. In certain embodiments, the latest version record 162 and the committed version record 160 can individually contain a default version value (e.g., "V0") when no transactions have been performed in the datastore 148 to modify any of the key-value pairs 166. When at least one transaction is performed, as illustrated in FIG. 3A, the latest version record 162 can include a new version value (e.g., "V1") different than the default version value. When at least one transaction is performed and completed successfully, the committed version record 160 can include a new version value (e.g., "V1") corresponding to the successfully completed transaction. The version index 164 can include one or more entries each identifying one or more parameters (e.g., "A1") that have been modified for a particular version value (e.g., "V1"). For example, one entry in the version index can identify that version "V1" involves changes to parameter "A1" in the key-value pairs 166.

Also shown in FIG. 3A, the management system 170 can include an interface component 172 and a control component 174 operatively coupled to one another. Though only the foregoing components are shown in FIG. 3A and other figures herein, in other embodiments, the management system 170 can also include network, storage, or other suitable types of components. The operations shown in FIGS. 3A-3F are used to illustrate maintaining atomicity in the datastore 148 by monitoring for successful completion of a transaction and selectively updating the committed version record 160. Various example values for the control records 161 and the key-value pairs 166 are used for illustration purposes.

The interface component 172 can be configured to receive a request 150 for performing a transaction that modifies one or more key-value pairs 166 in the datastore 148. For instance, as shown in FIG. 3A, the request 150 includes requested operations to modify a value for parameter "A1," delete parameter "A2," and add a new parameter "A3" with a corresponding value (i.e., "456"). In response, the interface component 172 can be configured to retrieve a current value of the latest version record 162 from the datastore 148. For instance, as shown in FIG. 3A, the current value in the latest version record 162 is "V1."

Figure 3B:
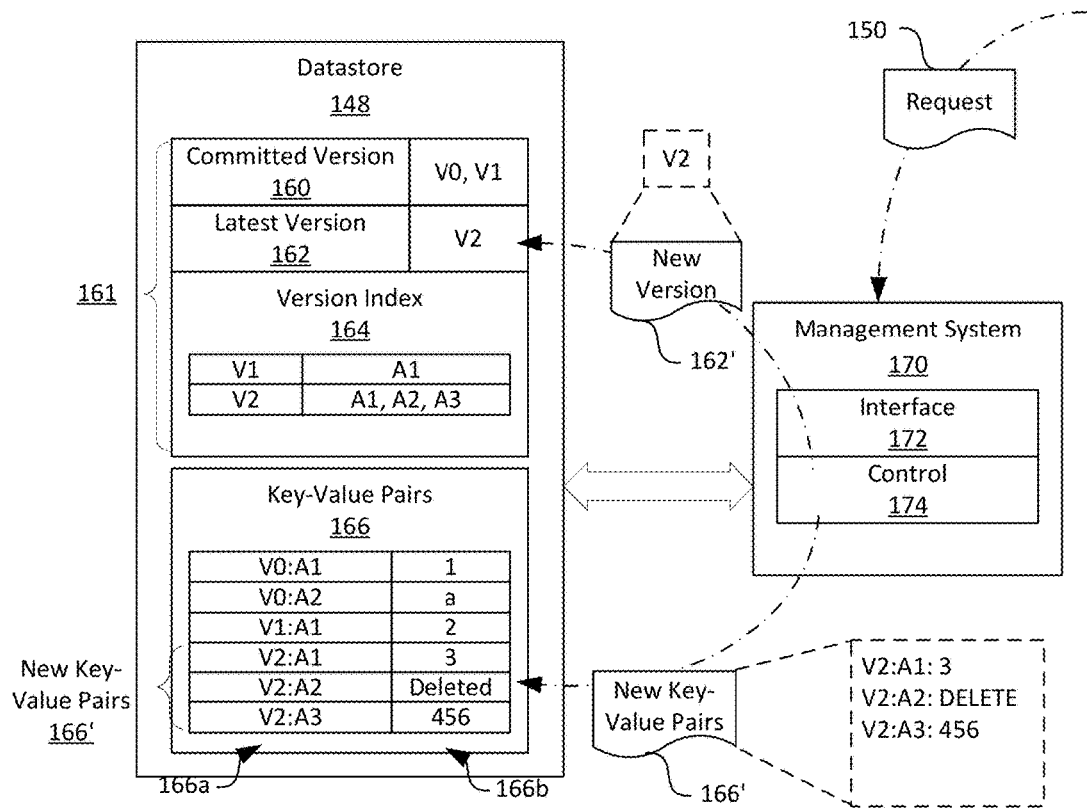

As shown in FIG. 3B, the interface component 172 can then pass the retrieved current value of the latest version record 162 to the control component 174 for further processing. The control component 174 can be configured to generate a new version value 162' for the latest version record 162 in response to the received request 150 based on the retrieved current value of the latest version record 162. In the illustrated example, the new version value 162' of the latest version record 162 is generated by incrementing from "V1" to "V2." In other examples, the new version value 162' can be generated using numerical values or in other suitable manners. Upon generating the new version value, the control component 174 can instruct the interface component 172 to write the new version value 162' into the latest version record 162.

The control component 174 can also be configured to creates a new key 166a for each of the parameters in the received request 150. For example, a new key 166a for the parameter "A1" with the new version value can be "V2:A1;" for the parameter "A2" can be "V2:A2;" and for the parameter "A3" can be "V2:A3." The control component 174 can then be configured to create new key-value pairs 166' in the datastore 148 with the new keys (i.e., "V2:A1," "V2:A2," and "V2:A3") and assign the new values, e.g., "3," "Deleted," and "456" to the created new key-value pairs 166', respectively. The control component 174 can then be configured to update the version index 164 to indicate that version "V2" impacts the parameters "A1," "A2," and "A3."

Figure 3C:
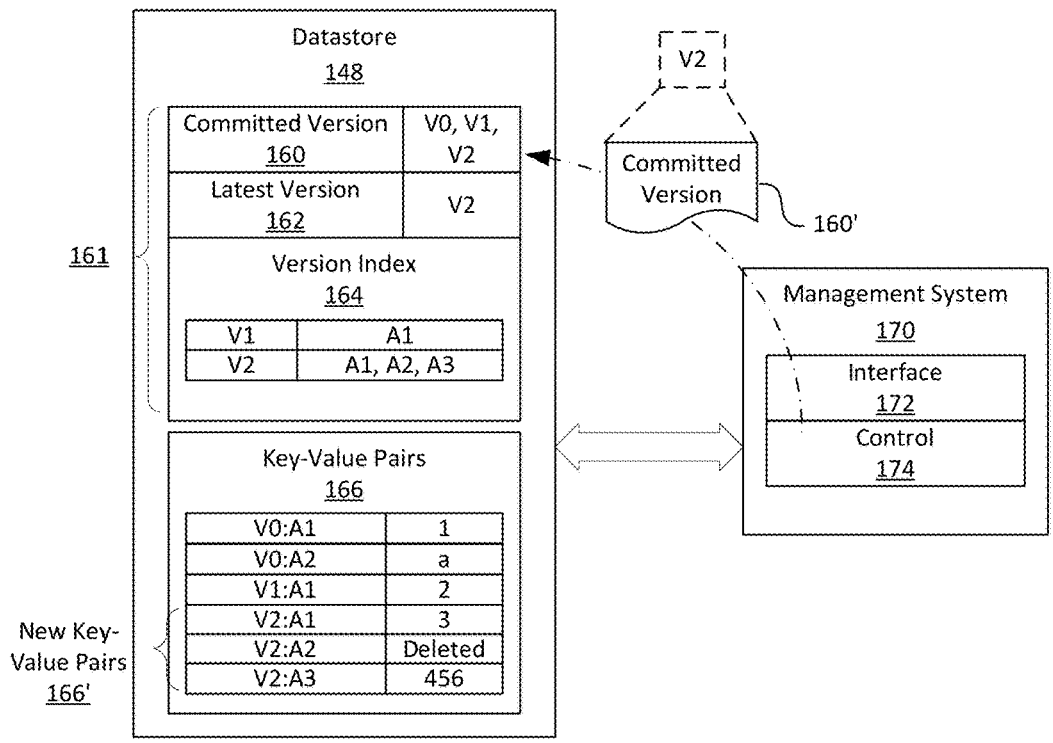

The control component 174 can be configured to determine whether all operations of the transaction, i.e., operations related to each of parameters "A1," "A2," and "A3." have completed successfully. FIG. 3C illustrates an example in which all of the operations have completed successfully. As shown in FIG. 3C, in response to determining that all of the operations of the transaction have completed successfully, the control component 174 can be configured to update the committed version record 160 to include the new version value, i.e., "V2" along with the previously committed versions, i.e., "V0" and "V1."

Figure 3D:
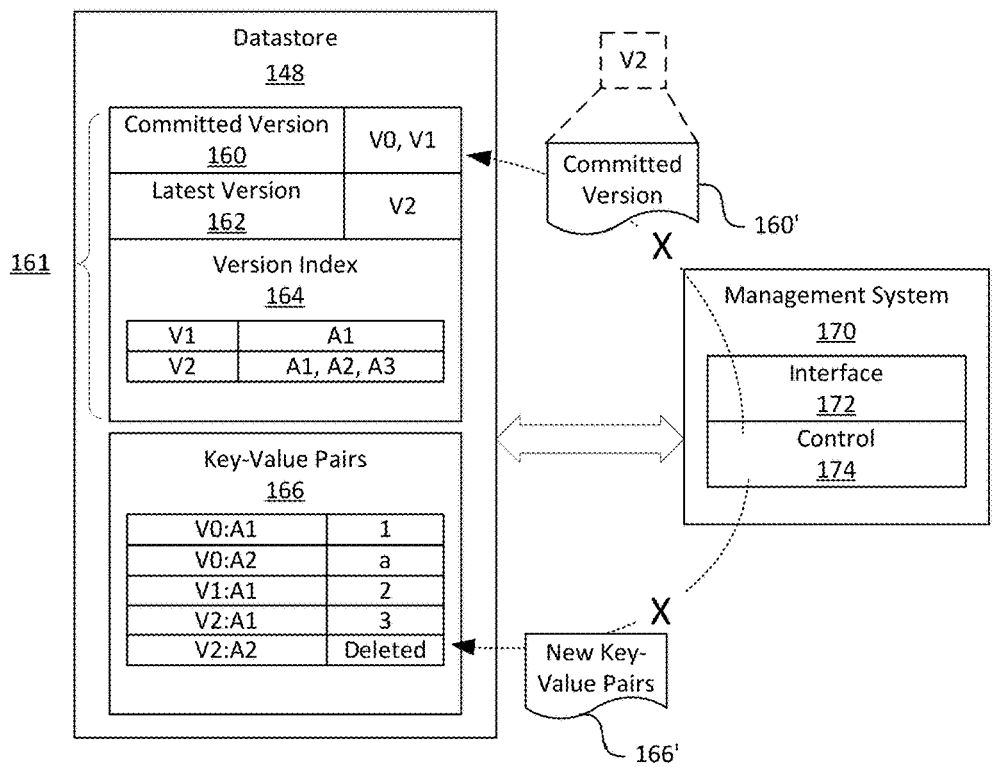

On the other hand, as shown in FIG. 3D, when at least one operation of the transaction failed, the control component 174 can be configured to prevent the committed version record 160 from being updated with the new version value. For instance, in the illustrated example, creating the new key-value pair 166' for the parameter "A3" has failed (shown with dotted line). In response, the control component 174 can be configured to maintain the current value(s) of the committed version record 160, i.e., "V0" and "V1." As such, in the illustrated example, the committed version record 160 can contain the previously committed version values of "V0" and "V1" even though the key-value pairs 166 include the newly created key-value pairs 166' for "V2" of the parameters "A1" and "A2."

Figure 3E:
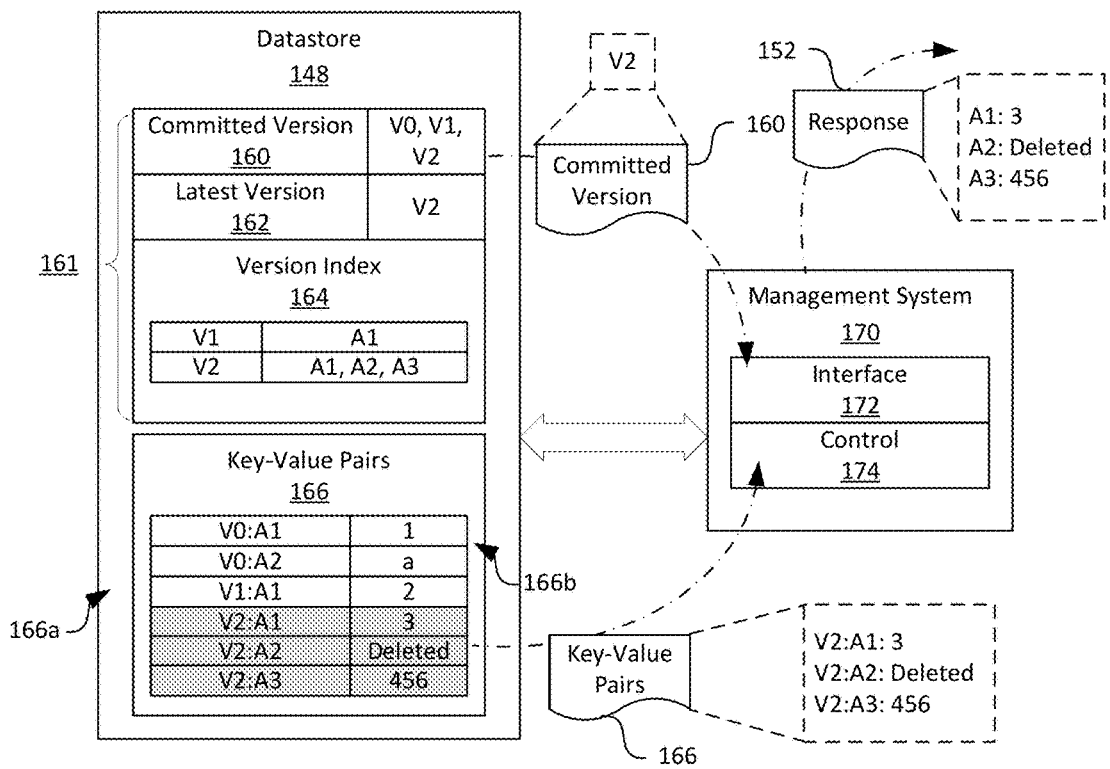

The control component 174 can be configured to utilize the version values in the committed version record 160 when responding to queries for current values of the parameters, e.g., "A1," "A2," and "A3." FIG. 3E illustrates a scenario corresponding to that of FIG. 3C in which the entire transaction is completed successfully. As such, in response to receive a query for current values of "A1," "A2," and "A3," the control component 174 can be configured to retrieve version values from the committed version record 160. The control component 174 can then be configured to determine whether the most recent version value, i.e., "V2" corresponds to value changes for the parameters by consulting the version index 164. In the illustrated example, all three parameters "A1," "A2," and "A3" correspond to "V2." In response, the control component 174 can be configured to retrieve a key-value pair 166 for each of the parameters "A1," "A2," and "A3" using the version value (i.e., "V2") and the names of the parameters as a key 166a, i.e., "V2:A1," "V2:A2," and "V2:A3." The control component 174 can then be configured to provide the corresponding values 166b from the retrieved key-value pairs 166 (shown in shades for clarity) as a response 152 to the query.

Figure 3F:
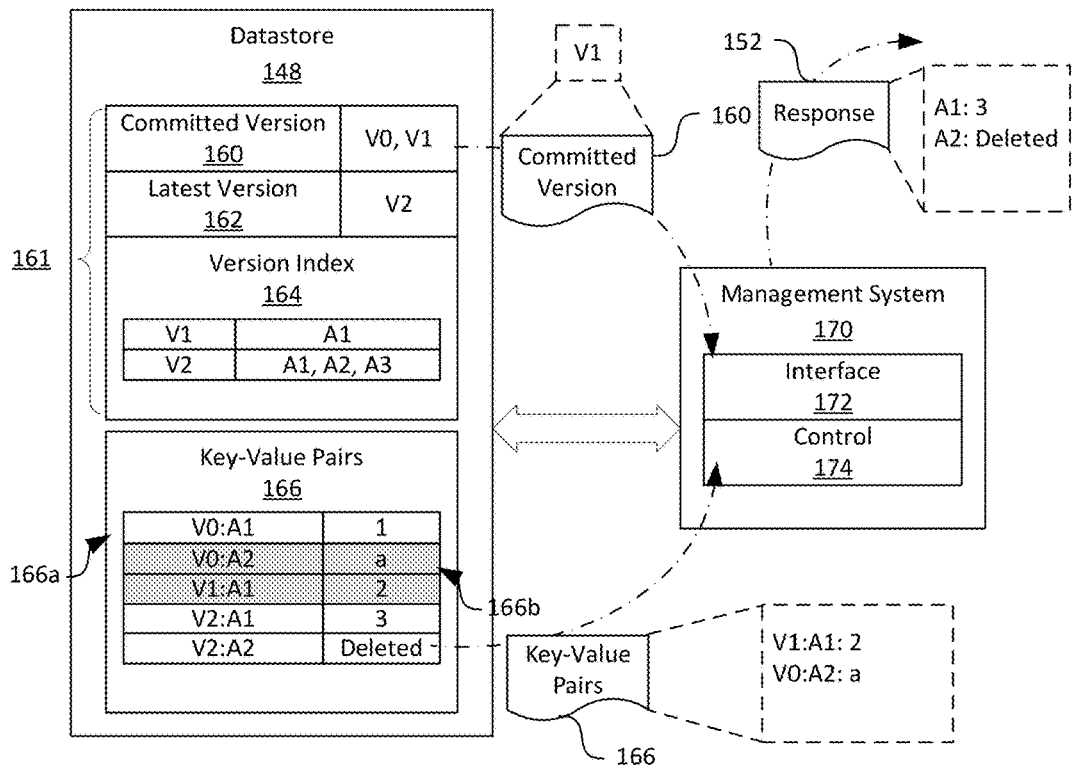

FIG. 3F illustrates a scenario corresponding to that of FIG. 3D in which the entire transaction is not completed successfully. As shown in FIG. 3F, the version values retrieved from the committed version record 160 include only "V0" and "V1." The control component 174 can then determine whether the most recent version value, i.e., "V1" impacts both parameters "A1" and "A2." In response to determining that the most recent version value "V1" only impacts parameter "A1," the control component 174 can be configured to determine whether a previous version value, i.e., "V0" impacts parameter "A2." In the illustrated example, "V0" denotes a default version value and thus does impact parameter "A2." As such, the control component 174 can be configured to retrieve the key-value pairs 166 (shown in shades for clarity) using the determined version values and the names of the parameters as keys 166a, i.e., "V1:A1" and "V0:A2." The control component 174 can then be configured to provide the corresponding values 166b from the retrieved key-value pairs 166 (shown in shades for clarity) as a response 152 to the query. Thus, even though another key-value pair 166, i.e., "V2:A1→3" exists in the datastore 148, the corresponding value, i.e., "3" for "V2:A1" is not provided in response to the query because at least one operation of the transaction corresponding to version "V2" has failed. As such, atomicity in the datastore 148 is achieved.

FIGS. 4A-4D are schematic block diagrams illustrating a management system 170 that provides isolation transactional support in a database in the distributed computing system 100 in accordance with embodiments of the present technology. As shown in FIGS. 4A-4D, the management system 100 can also be configured to ensure isolation by monitoring for version values in the committed version record 160 and the latest version record 162 and implementing a timer 176 that is configured to maintain an elapsed time since a new version value 162' (shown in FIG. 4B) is created in the latest version record 162. For instance, in the example shown in FIG. 4A, the interface component 172 can be configured to receive a first request 150 that is similar to the request 150 shown in FIG. 3A. In response, the interface component 172 can be configured to retrieve version values from both the committed version record 160 and the latest version record 162. The control component 174 can then be configured to determine whether the latest version record 162 contains a version value that is indicated as committed in the committed version record 160. In the illustrated example, the latest version record 162 contains a version value of "V1" which is included in the committed version record 160. In response, the control component 174 can deem that the transaction related to version value "V1" has completed successfully, and thus allow the request to modify the parameters "A1," "A2," and "A3" to proceed.

Figure 4A:
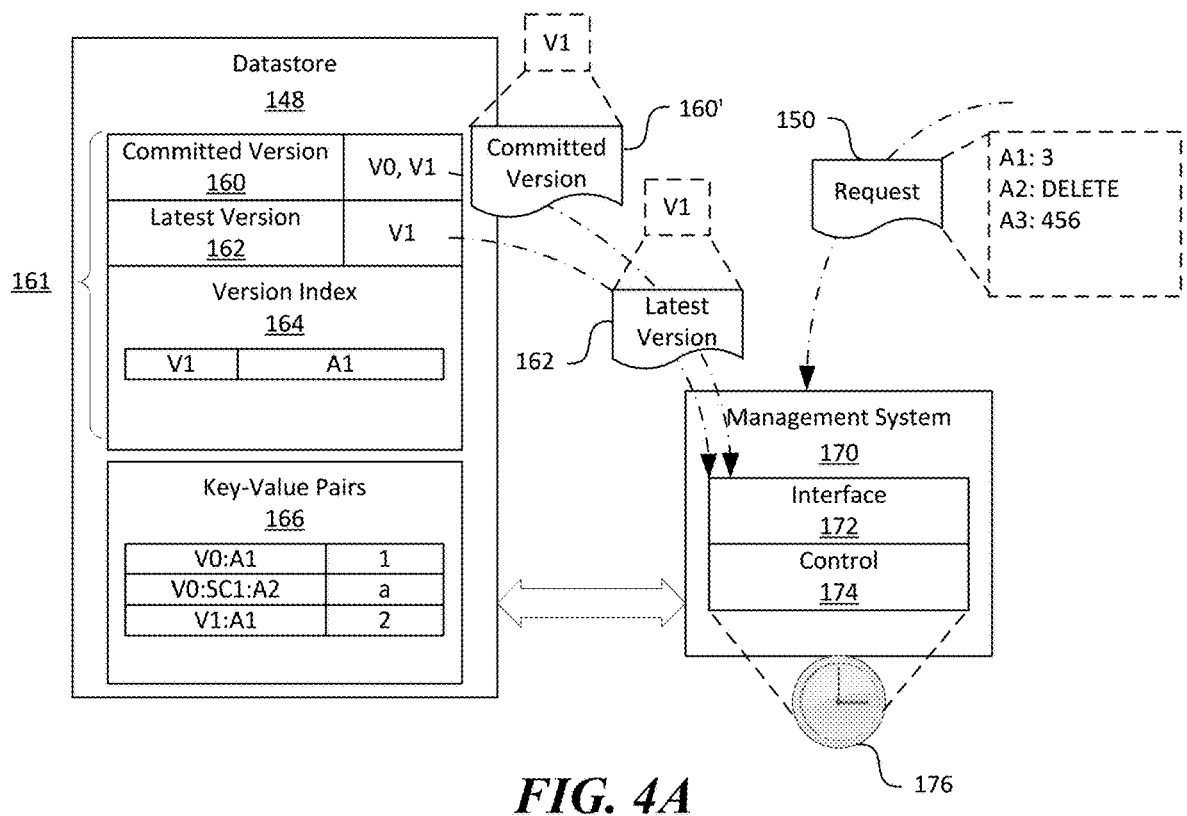
FIGS. 4A-4D are schematic block diagrams illustrating a management system that provides isolation transactional support in a non-relational database in the distributed computing system in accordance with embodiments of the present technology.
Figure 4B:
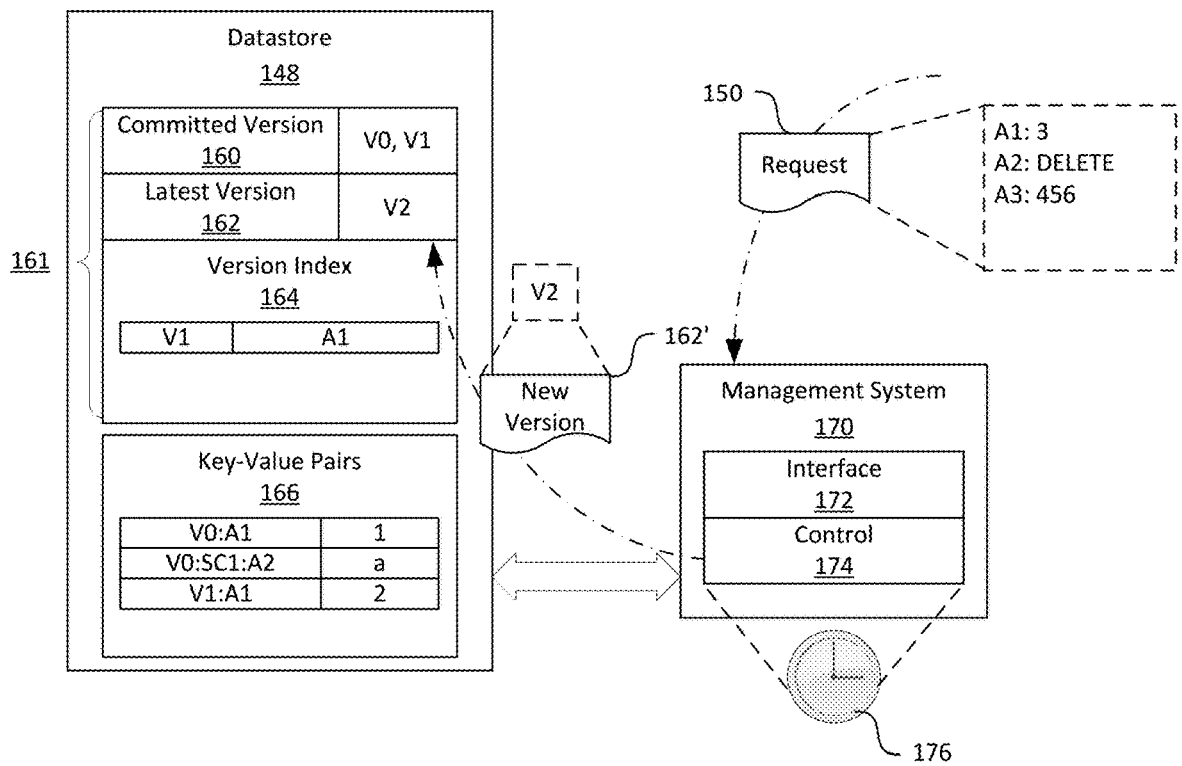
Figure 4C:
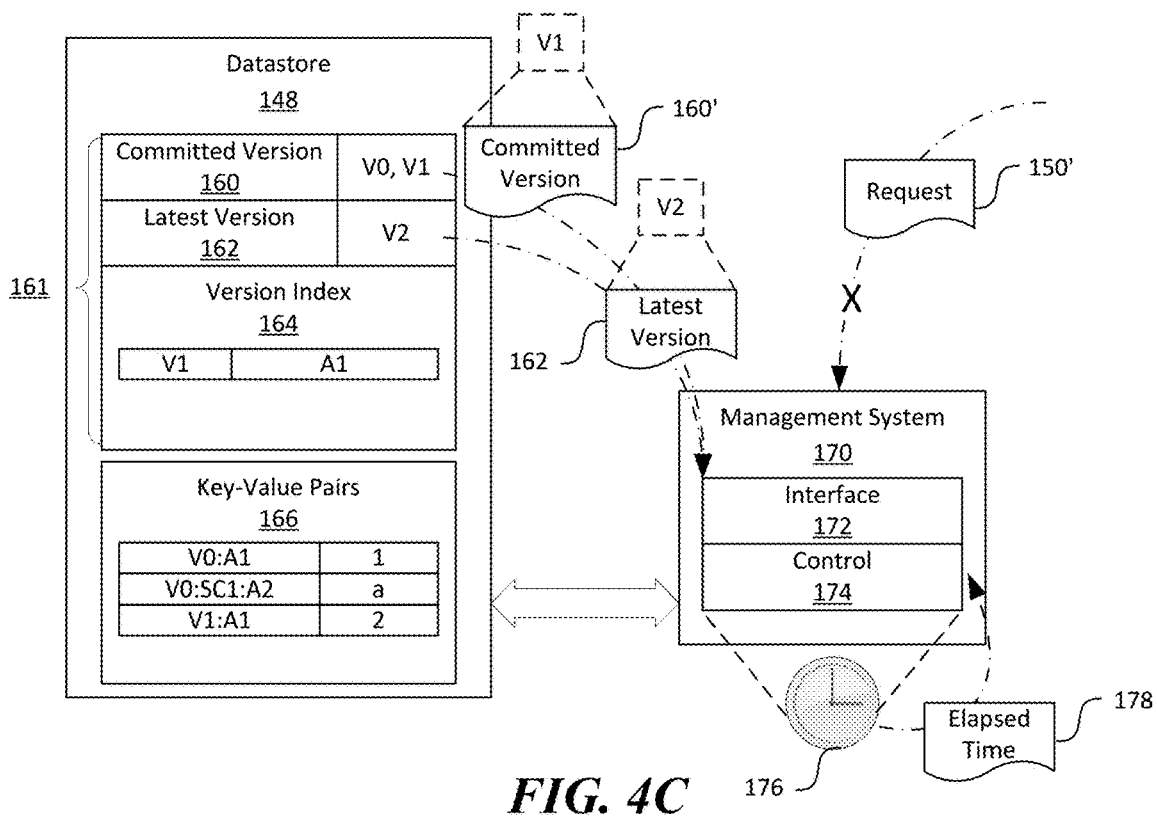
Figure 4D:
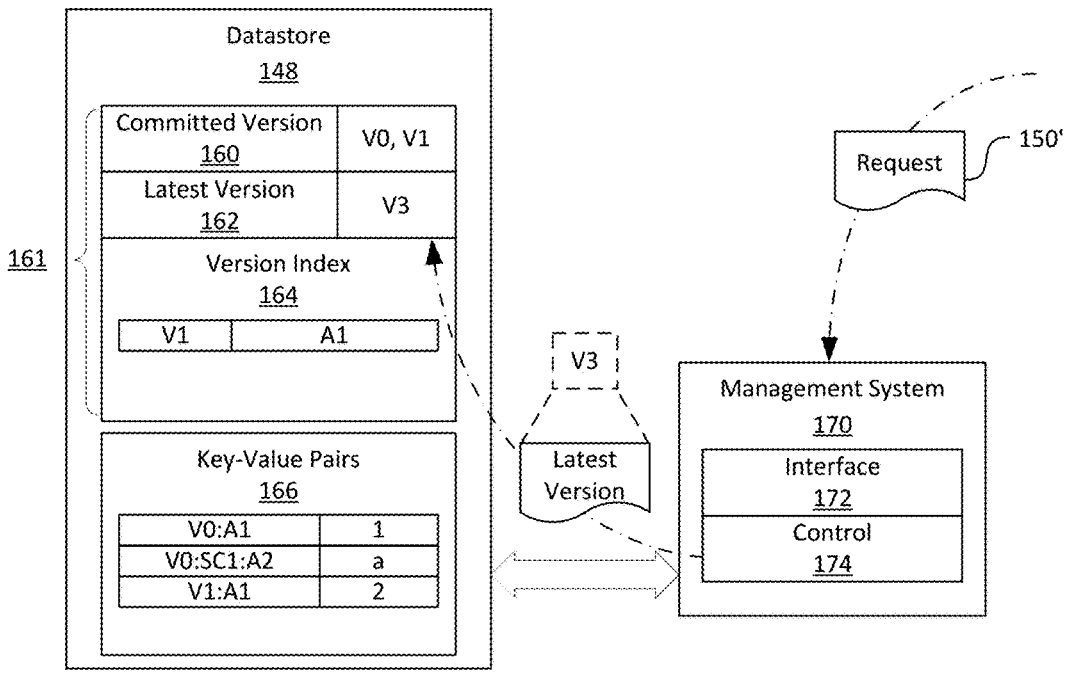

FIG. 4B illustrates an example scenario in which the latest version record 162 does not contain a version value that is included in the committed version record 160. For instance, as shown in FIG. 4B, the latest version record 162 can contain a version value of "V2" that is not indicated in the committed version record 160 as a committed version. In response, as shown in FIG. 4C, the control component 174 can retrieve an elapsed time 178 from the timer 176 which has been started when the control component 174 modified the version value of the latest version record 162 from "V1" to "V2." The control component 174 can be configured to determine whether the elapsed time 178 of the timer 176 exceeds a threshold. In response to determining that the elapsed time 178 does not exceed the threshold, the control component 174 can be configured to reject or delay processing the new transaction corresponding to the request 150 such that the prior transaction can be isolated from processing of the new transaction. In response to determining that the elapsed time 178 exceeds the threshold, the control component 174 can be configured to deem the prior transaction corresponding to version "V2" to have failed and initialize processing of the new transaction related to the received request 150, as shown in FIG. 4D. For instance, the control component 174 can be configured to generate a new version value, e.g., "V3" for the latest version record 162 and continue the operations described above with reference to FIGS. 3A-3F.

Several embodiments of the disclosed technology can thus provide certain transactional support for the datastore 148 having key-value pairs 166 to ensure atomicity and isolation. For instance, by creating new key-value pairs 166' for every modification of a parameter, e.g., "A1" and selectively updating the committed version record 160, a value of a version corresponding to a failed transaction is not provided as a current value for the parameter. In another aspect, by implementing the timer 176 to maintain an elapsed time 178 when a new version is created in the latest version record 162, a transaction in the datastore 148 can be isolated from other transactions as long as the elapsed time 178 does not exceed a threshold. Thus, the management system 170 can ensure transactions are processed reliably in the datastore 148.

FIGS. 5A-5D are flow diagrams illustrating aspects of processes for implementing certain transactional support for non-relational databases in accordance with embodiments of the present technology. Though embodiments of the processes are described in the context of the distributed computing system 100 of FIGS. 1-4D, in other embodiments, aspects of the processes can also be implemented in computing systems with different and/or additional components.

Figure 5A:
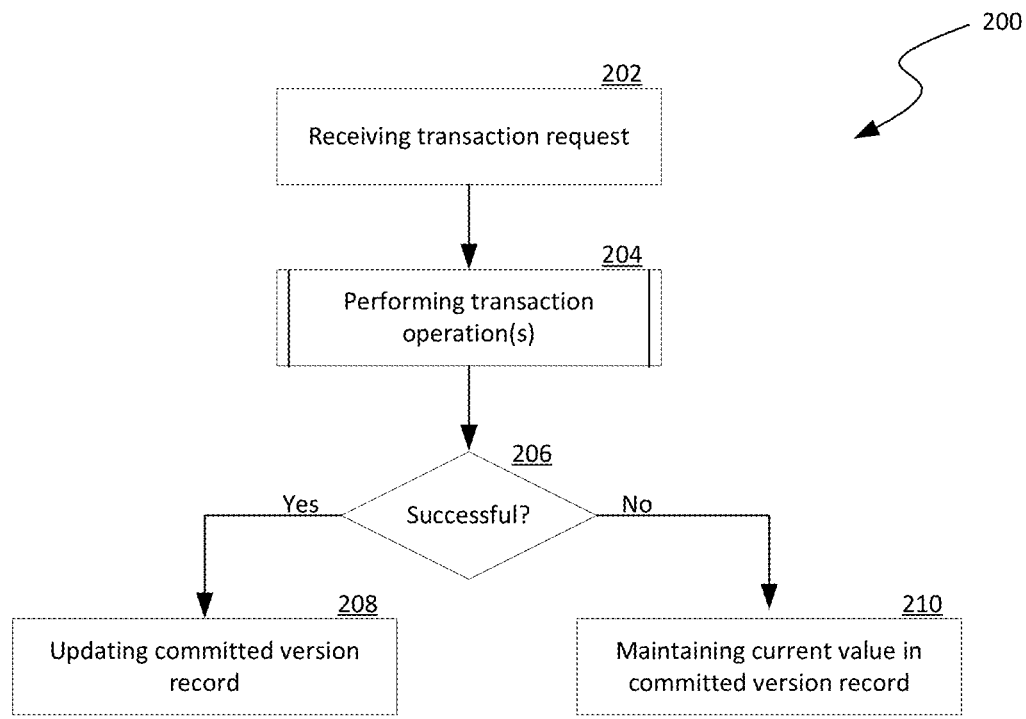
FIGS. 5A-5D are flow diagrams illustrating aspects of processes for implementing certain transactional support for non-relational databases in accordance with embodiments of the present technology.

As shown in FIG. 5A, a process 200 can include receiving a transaction request at stage 202. The transaction request can include multiple operations to be performed in a database. The process 200 can then include performing the multiple operations of the transaction at stage 204. Example operations of performing the operations are described below with reference to FIG. 5B. The process 200 can then include a decision stage 206 to determine whether all of the operations of the transaction are completed successfully. In response to determining that all of the operations of the transaction are completed successfully, the process 200 proceeds to updating a committed version record in the database with a new version corresponding to the performed transaction. In response to determining that at least one operation has failed, the process 200 proceeds to maintaining a version in the committed version record without updating to the new version corresponding to the transaction.

Figure 5B:
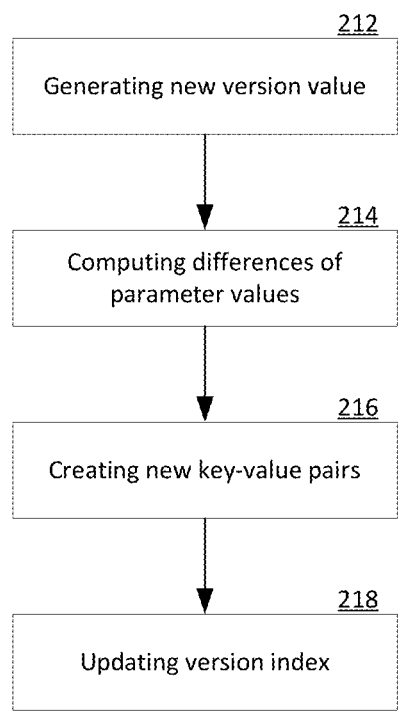

As shown in FIG. 5B, example operations of performing the transaction can include generating a new version value at stage 212 and computing a difference between existing values of parameters and new values included in a received transaction request at stage 214. The example operations can then include creating new key-value pairs using the generated new version value and names of the parameters as keys and the new values as corresponding values of the key-value pairs at stage 216, as described in more detail above with reference to FIGS. 3A-3F. The example operations can also include updating a version index at stage 218 to indicate identities of parameters impacted by the new version.

Figure 5C:
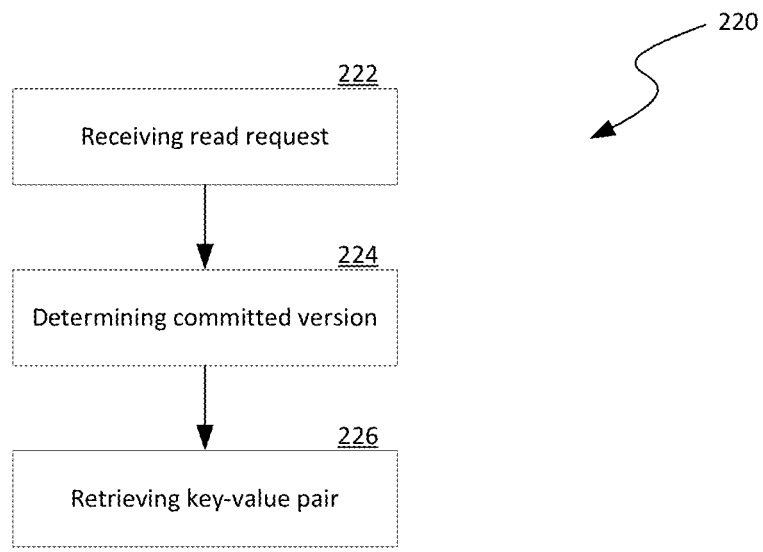

FIG. 5C is a flowchart illustrating a process 220 of reading a value of a parameter from a database having key-value pairs. As shown in FIG. 5C, the process 220 can include receiving a read request or query at stage 222. The process 220 can also include determining a committed version in the database based on, for example, version value(s) in a committed version record and retrieve key-value pair according to the committed version at stage 226, as described above with reference to FIGS. 3A-3F.

Figure 5D:
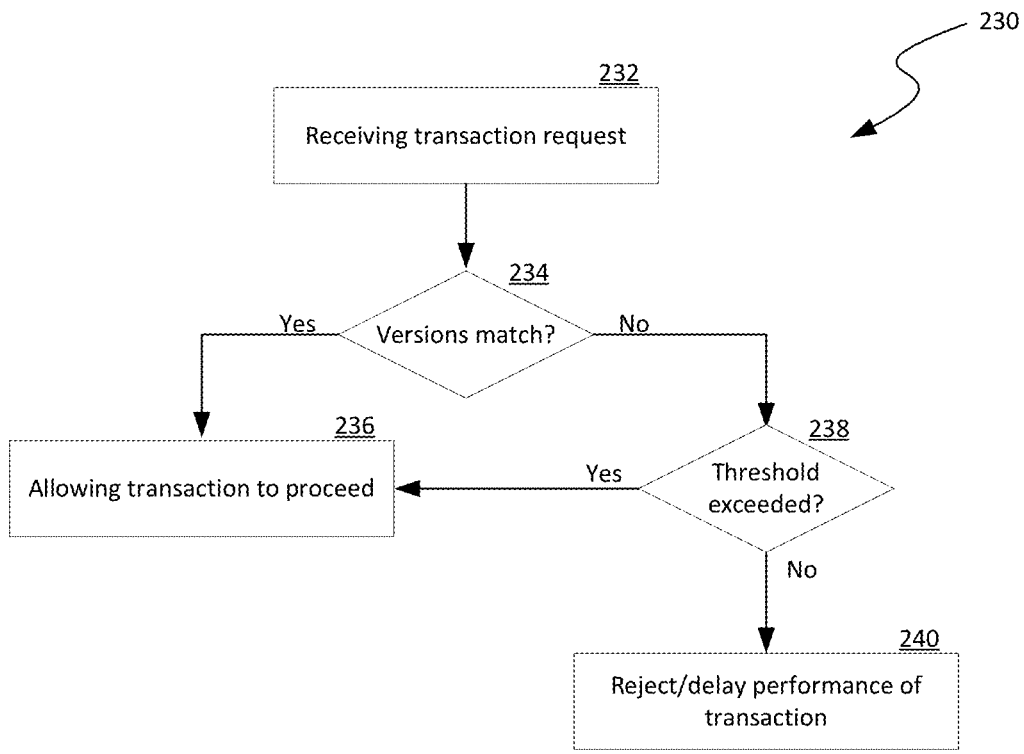

FIG. 5D is a flowchart illustrating a process 230 of providing isolation transaction support in a database having key-value pairs. As shown in FIG. 5D, the process 230 can include receiving a transaction request to update one or more values of parameters in the database at stage 232. The process 230 can then include a decision stage 234 to determine whether a current value in a latest version record matches that in a committed version record. In response to determining that the current value in the latest version record matches that in the committed version record, the process 230 proceeds to allowing the transaction corresponding to the received request to proceed at stage 236. Otherwise, the process 230 proceeds to another decision stage 238 to determine whether an elapsed time from modifying the value of the latest version record exceeds a threshold. In response to determine that the elapsed time exceeds the threshold, the process 230 proceeds to allowing the transaction to proceed at stage 236. Otherwise, the process 230 proceeds to rejection or delay the transaction at stage 240, as described in more detail above with reference to FIGS. 4A-4D.

Figure 6:
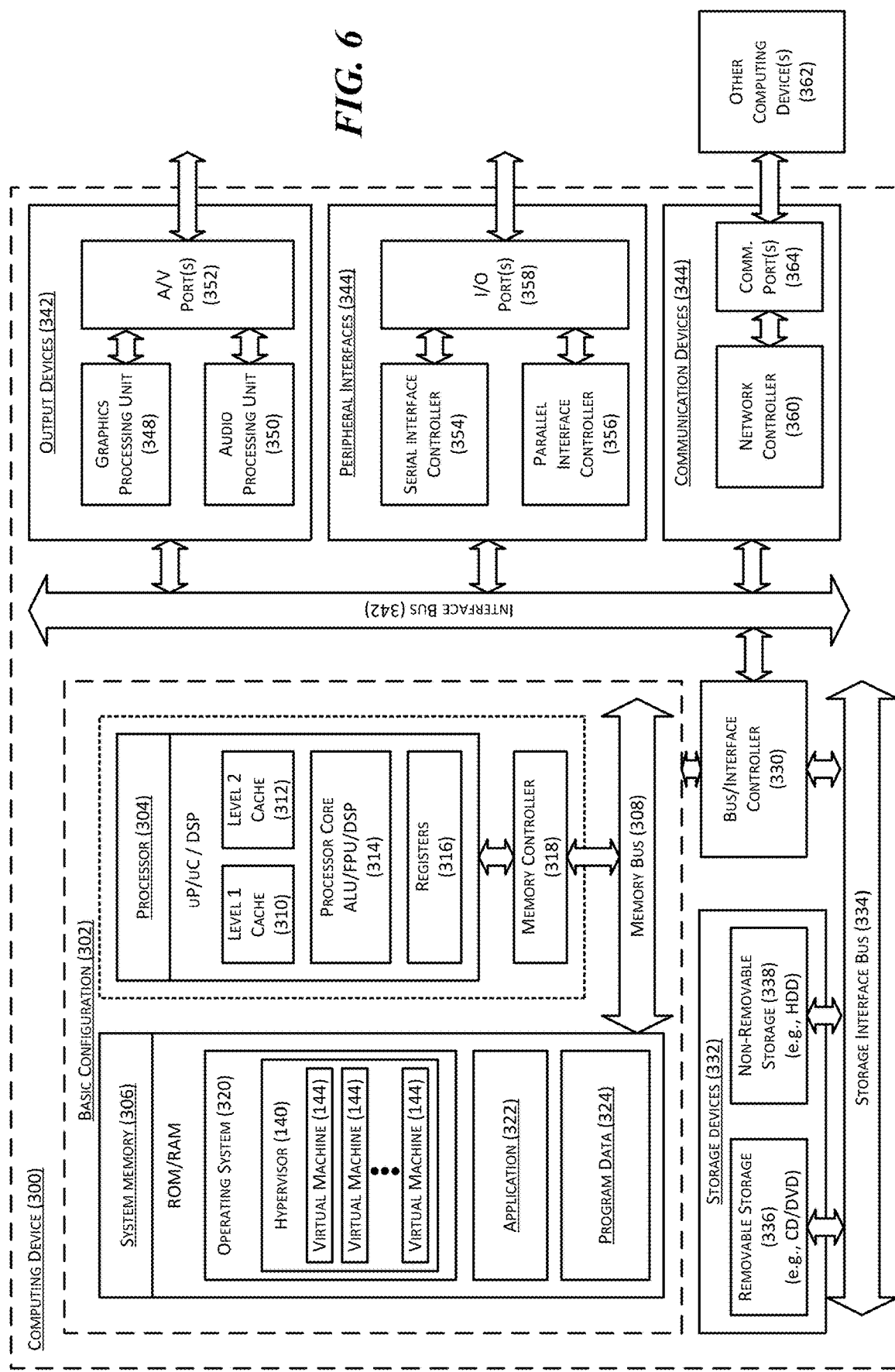
FIG. 6 is a computing device suitable for certain components of the distributed computing system in FIG. 1.

FIG. 6 is a computing device 300 suitable for certain components of the distributed computing system 100 in FIG. 1, for example, the server 106, the client device 102, or the resource manager 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 7, the operating system 320 can include a hypervisor 140 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of providing transactional support to a database hosted in a computing system having multiple servers, the database having a set of key-value pairs each with a key and a corresponding value, the method comprising:

receiving, at a server in the computing system, a request to update a parameter with a new value in the database, the parameter corresponding to an existing key-value pair having an existing value; and in response to receiving the request, at the server in the computing system, generating a new version value for the key-value pairs in the database;

creating, in the database, a new key-value pair corresponding to the parameter using both the generated new version value and a name of the parameter as a key and the new value as the corresponding value for the created new key-value pair;

determining whether creating the new key-value pair corresponding to the parameter is completed successfully in the database; and in response to determining that creating the new key-value pair corresponding to the parameter is not completed successfully, maintaining a version value in a committed version record in the database without updating the committed version record with the generated new version value, the maintained version value corresponding to the existing key-value pair of the parameter such that, instead of returning the new value, the existing value is returned as a current value of the parameter in response to a query for the current value of the parameter.

2. The method of claim 1 wherein generating the new version value includes:
accessing a latest version record of the database to determine a current version value in the database; and
generating the new version value by incrementing the determined current version value in the database.

3. The method of claim 1, further comprising updating a version index to indicate that the new version value is related to the parameter.

4. The method of claim 1, further comprising in response to determining that creating the new key-value pair corresponding to the parameter is completed successfully, updating the committed version record in the database with the new version value to indicate that the new version value is a committed version value such that the new value is returned as the current value of the parameter in response to a query for the current value of the parameter.

5. The method of claim 1 wherein:
the parameter is a First parameter;
the new value is a first new value;
the new key-value pair is a first new key-value pair;
the request also includes to update a second parameter with a second new value in the database; and
the method further includes creating, in the database, a second new key-value pair corresponding to the second parameter using both the generated new version value and a name of the second parameter as a key and the second new value as the corresponding value for the created second new key-value pair.

6. The method of claim 1 wherein:
the parameter is a first parameter;
the new value is a first new value;
the new key-value pair is a first new key-value pair;
the request also includes to update a second parameter with another new value in the database; and
determining whether creating the new key-value pair corresponding to the parameter is completed successfully in the database includes:
determining whether creating the first new key-value pair corresponding to the first parameter and a second new key-value pair corresponding to the second parameter is completed successfully in the database; and
in response to determining that at least one of creating the first or second key-value pair is not completed successfully, maintaining the version value in the committed version record in the database without updating the committed version record with the generated new version value.

7. The method of claim 1 wherein:
the parameter is a first parameter;
the new value is a first new value;
the new key-value pair is a first new key-value pair;
the request also includes to update a second parameter with another new value in the database; and
determining whether creating the new key-value pair corresponding to the parameter is completed successfully in the database includes:
determining whether creating the first new key-value pair corresponding to the first parameter and a second new key-value pair corresponding to the second parameter is completed successfully in the database; and
in response to determining that creating both the first and second key-value pairs is completed successfully, updating the committed version record in the database with the new version value to indicate that the first new version value is a committed version value such that the first new value is returned as the current value of the first parameter in response to a query for the current value of the first parameter and the second new value is returned as a current value of the second parameter in response to a query for the current value of the second parameter.

8. The method of claim 1 wherein:
the parameter is a first parameter;
the new value is a first new value;
the request is a first request; and
the method further includes:
receiving a second request to update a second parameter with a second new value in the database;
in response to receiving the second request,
determining whether the a current version value of the database matches the version value in the committed version record; and
in response to determining that the current version value matches the version value in the committed version record, allowing processing of the second request in the database.

9. The method of claim 1 wherein:
the parameter is a first parameter;
the new value is a first new value;
the request is a first request; and
the method further includes:
receiving a second request to update a second parameter with a second new value in the database;
in response to receiving the second request, determining whether the a current version value of the database matches the version value in the committed version record; and
in response to determining that the current version value does not match the version value in the committed version record,
determining whether an elapsed time from generating the new version value exceeds a threshold,
in response to determining that the elapsed time exceeds the threshold, allowing processing of the second request in the database; and
in response to determining that the elapsed time does not exceed the threshold, rejecting or delaying processing of the second request in the database.

10. A computing device in a distributed computing system, the computing device comprising:
a processor; and
a memory operatively coupled to the processor, the memory containing instructions executable by the processor to cause the computing device to:
upon receiving, at the computing device, a request to update multiple parameters each with a new value in the database, the multiple parameters each corresponding to an existing key-value pair having an existing value, generate a new version value for the key-value pairs in the database;
create, in the database, a new key-value pair corresponding to each of the multiple parameters using both the generated new version value and a name of the each of the parameters as a key and the new value as the corresponding value for the created new key-value pair;

determine whether creating all of the new key-value pairs corresponding to the multiple parameters in the database is completed successfully;

in response to determining that creating the new key-value pair corresponding to one of the multiple parameters is not completed successfully, maintain a version value in a committed version record in the database without updating the committed version record with the generated new version value, the maintained version value corresponding to the existing key-value pairs of the multiple parameters; and in response to a query for a current value of at least one of the multiple parameters access the committed version record in the database and return, based on the committed version record the existing value as the current value of the at least one of the multiple parameters.

11. The computing device of claim 10 wherein to generating the new version value includes to:

access a latest version record of the database to determine a current version value in the database; and generate the new version value by incrementing the determined current version value in the database.

12. The computing device of claim 10 wherein the memory includes additional instructions executable by the processor to cause the computing device to update a version index in the database to indicate that the new version value is related to the multiple parameters.

13. The computing device of claim 10 wherein the memory includes additional instructions executable by the processor to cause the computing device to in response to determining that creating the new key-value pairs corresponding to the multiple parameters is completed successfully, updating the committed version record in the database with the new version value to indicate that the new version value is a committed version value such that one of the new values is returned as the current value of one of the multiple parameters in response to a query for the current value of the one of the multiple parameters.

14. The computing device of claim 10 wherein the memory includes additional instructions executable by the processor to:

receive a query for a current value of one of the multiple parameters; and in response to receiving the query, access the committed version record to determine the version value;

using a combination of the determined version value and a name of the one of the multiple parameters as a key to locate a key-value pair in the database; and returning, as a query result, a value corresponding to the located key-value pair.

15. The computing device of claim 10 wherein the memory includes additional instructions executable by the processor to:

receive a query for a current value of one of the multiple parameters; and in response to receiving the query, access the committed version record to determine the version value;

determining whether a combination of the determined version value and a name of the one of the multiple parameters corresponds to a key-value pair in the database; and in response to determining that the combination of the determined version value and the name of the one of the multiple parameters corresponds to a key-value pair in the database, returning, as a query result, a value corresponding to the located key-value pair.

16. The computing device of claim 10 wherein the memory includes additional instructions executable by the processor to:

receive a query for a current value of one of the multiple parameters; and in response to receiving the query, access the committed version record to determine a first version value;

determining whether a combination of the determined first version value and a name of the one of the multiple parameters corresponds to a key-value pair in the database; and in response to determining that the combination of the determined first version value and the name of the one of the multiple parameters does not correspond to a key-value pair in the database, access the committed version record to determine a second version value, the first version value being more recent than the second version value;

using a combination of the determined second version value and a name of the one of the multiple parameters as a key to locate a key-value pair in the database;

returning, as a query result, a value corresponding to the located key-value pair.

17. A method of providing transactional support to a database hosted in a computing system having multiple servers, the database having a set of key-value pair each with a key and a corresponding value, the method comprising:

receiving, at a server in the computing system, a request to update a first parameter with a first new value and to a second parameter with a second new value in the database; and in response to receiving the request, at the server in the computing system, generating a new version value for the key-value pairs in the database;

creating, in the database, a first new key-value pair corresponding to the first parameter using both the generated new version value and a name of the first parameter as a key and the first new value as the corresponding value for the created first new key-value pair;

creating, in the database, a second new key-value pair corresponding to the second parameter using both the generated new version value and a name of the second parameter as a key and the second new value as the corresponding value for the created second new key-value pair;

determining whether creating both the first and second new key-value pairs in the database is completed successfully; and in response to determining that at least one of creating the first or second new key-value pair is not completed successfully, maintaining a version value in a committed version record in the database without updating the committed version record with the generated new version value, the maintained version value corresponding to existing key-value pairs of the first and second parameters such that, instead of returning the first or second new value, an existing value is returned as a current value of the first or second parameter in response to a query for the current value of the first or second parameter, respectively.

18. The method of claim 17 wherein generating the new version value includes:
   accessing a latest version record of the database to determine a current version value in the database; and
   generating the new version value by incrementing the determined current version value in the database.

19. The method of claim 17, further comprising updating a version index to indicate that the new version value is related to both the first and second parameters.

20. The method of claim 17, further comprising in response to determining that creating both the first and second new key-value pair is completed successfully, updating the committed version record in the database with the new version value to indicate that the new version value is a committed version value such that the first or second new value is returned as the current value of the first or second parameter in response to a query for the current value of the first or second parameter, respectively.

* * * * *